US011611287B2

(12) United States Patent
Schmitt et al.

(10) Patent No.: US 11,611,287 B2
(45) Date of Patent: Mar. 21, 2023

(54) DUAL SOURCED COMMON 3-LEVEL VSCF

(71) Applicant: Hamilton Sundstrand Corporation, Charlotte, NC (US)

(72) Inventors: Dwight D. Schmitt, Rockford, IL (US); Mustansir Kheraluwala, Lake Zurich, IL (US); Eric A. Carter, Monroe, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 226 days.

(21) Appl. No.: 17/173,070

(22) Filed: Feb. 10, 2021

(65) Prior Publication Data
US 2022/0255452 A1 Aug. 11, 2022

(51) Int. Cl.
*H02M 7/08* (2006.01)
*H02M 5/458* (2006.01)
*H02M 1/08* (2006.01)
*H02M 1/00* (2006.01)

(52) U.S. Cl.
CPC ............ *H02M 5/458* (2013.01); *H02M 1/08* (2013.01); *H02M 1/0054* (2021.05)

(58) Field of Classification Search
CPC . H02M 5/458; H02M 2001/0054; H02M 1/08
See application file for complete search history.

(56) References Cited

U.S. PATENT DOCUMENTS

| 6,049,195 A | 4/2000 | Geis et al. |
| 10,003,186 B2 | 6/2018 | Wagner et al. |
| 10,027,113 B2 | 7/2018 | Wangemann et al. |
| 10,759,540 B2 | 9/2020 | Long |
| 2010/0148372 A1 | 6/2010 | Farnworth et al. |
| 2017/0198401 A1* | 7/2017 | Phillips .................. H02K 35/02 |
| 2019/0280564 A1 | 9/2019 | Pal et al. |
| 2020/0149427 A1 | 5/2020 | Long |
| 2020/0244179 A1* | 7/2020 | Feng .................... H02M 7/4833 |
| 2020/0295663 A1* | 9/2020 | Yelaverthi ............... H02M 1/15 |

OTHER PUBLICATIONS

Extended European Search Report for European Patent Application No. EP22156066.7, dated Jun. 30, 2022.
(Continued)

*Primary Examiner* — Adi Amrany
*Assistant Examiner* — Esayas G Yeshaw
(74) *Attorney, Agent, or Firm* — Locke Lord LLP; Joshua L. Jones; Gabrielle L. Gelozin

(57) ABSTRACT

A system comprises a first 3-phase rectifier having a positive DC lead and a negative DC lead and a second 3-phase rectifier having a positive DC lead and a negative DC lead. The system also includes a 4-phase, 3-level inverter connected to the first and second 3-phase rectifiers. A method comprises receiving variable frequency, 3-phase power from a first generator, receiving variable frequency, 3-phase power from a second generator, rectifying the variable frequency, 3-phase power from each of the first and second generators into DC power. And inverting the DC power into 4-phase, constant frequency power for powering a load.

17 Claims, 4 Drawing Sheets

(56) References Cited

OTHER PUBLICATIONS

Sharifzadeh Mohammad, et al: "Hybrid SHM-SHE Pulse-Amplitude Modulation for High-Power Four-Leg Inverter", IEEE Transactions on Industrial Electronics, IEEE Service Center, Piscataway, NJ, USA, vol. 63, No. 11, Nov. 1, 2016 (Nov. 1, 2016), pp. 7234-7242, XP011625157, ISSN: 0278-0046, DOI: 10.1109/TIE.2016.2538204; retrieved on Oct. 7, 2016.

Yaramasu Venkata, et al: "Predictive control of four-leg power converters", 2015 IEEE International Symposium on Predictive Control of Electrical Drives and Power Electronics (PRECEDE), IEEE, Oct. 5, 2015 (Oct. 5, 2015), pp. 121-125, XP032858313, Doi: 10.1109/PRECEDE.2015.7395594; retrieved on Jan. 29, 2016.

David Wyatt, et al: "Aircraft Electrical and Electronic Systems—Principles, Operation and Maintenance" In: "Aircraft Electrical and Electronic Systems—Principles, Operation and Maintenance", Aug. 21, 2009 (Aug. 21, 2009), Great Britain, XP055610484, ISBN: 978-0-7506-8695-2.

\* cited by examiner

DUAL SOURCED COMMON 3-LEVEL VSCF

BACKGROUND

1. Field

The present disclosure relates to power generation systems, and more particularly to aircraft generators.

2. Description of Related Art

Power conversion for aircraft generators and onboard loads is a specialty with increasing demands upon it as the trend toward more-electric aircraft progresses. Conventional DC-link based 3-phase, 2-level inverter VSCF (variable speed constant frequency) electric power generation requires neutral-forming transformer (NFT) which are heavy and can be inefficient. Hence, not desirable for aerospace applications especially for high power (e.g., >50 kW), and un-pressurized environments.

Further, if nominal output voltage of the input engine-driven generators are about same as required VSCF output voltage then typically the NFT would be required to provide additional attribute of stepping up the voltage to account for various voltage losses in the conversion system. 4-phase, 2-level inverter implementation helps eliminate NFT but still lacks ability to step-up the voltage, and also suffers from heavy power quality/EMC (electromagnetic compatibility) filters and lower efficiency.

4-phase, 3-level inverters help mitigate above weight/efficiency/power quality issues but still lack ability to compensate for voltage losses. Further, 4-phase, 3-level inverters also require balanced split DC link voltage. Typically, this is addressed by additional mid-point balancing closed-loop control techniques which results in additional switching losses and dynamic performance degradation under certain operating conditions.

The conventional techniques have been considered satisfactory for their intended purpose. However, there is an ever present need for improved systems and methods for light weight, high efficiency power generation. This disclosure provides a solution for this need.

SUMMARY

A system comprises a first 3-phase rectifier having a positive DC lead and a negative DC lead and a second 3-phase rectifier having a positive DC lead and a negative DC lead. The system also includes a 4-phase, 3-level inverter connected to the first and second 3-phase rectifiers.

The positive DC lead of the first 3-phase rectifier can be connected to a positive input terminal of the 4-phase, 3-level inverter and the negative DC lead of the first 3-phase rectifier can be connected to a midpoint input terminal of the 4-phase, 3-level inverter. The positive DC lead of the second 3-phase rectifier can be connected to the midpoint input terminal of the 4-phase, 3-level inverter and the negative DC lead of the second 3-phase rectifier can be connected to a negative input terminal of the 4-phase, 3-level inverter. The 4-phase, 3-level inverter can include a respective output for each of four AC phases including a neutral AC phase.

The system can also include a first generator with three phases connected to the first 3-phase rectifier, and second generator with three phases connected to the second 3-phase rectifier. The first and second generators can be variable frequency generators. The first and second generators can be connected to a common output shaft of a prime mover or the first and second generators may be connected to a respective output shaft of a respective prime mover.

Each of the three phases of the first and second rectifiers can be configured as a 115 V input phase and each of the first and second 3-phase rectifiers is configured for 270 V output to the 4-phase, 3-level inverter. The 4-phase, 3-level inverter can be configured to output 115 V, 400 Hz AC power from the four AC phases. Each of the first and second 3-phase rectifiers can include a respective capacitor connected across the respective positive and negative DC leads. The system can also include at least one GCU (generator control unit) operatively connected to control the first and second generators using feedback measured across the respective capacitors.

The 4-phase, 3-level inverter can include a first input capacitor connected in series with a second input capacitor, where the first input capacitor can connect between the positive and midpoint input terminals of the 4-phase, 3-level inverter, and the second capacitor can connect between the midpoint and negative input terminals of the 4-phase, 3-level inverter. The 4-phase, 3-level inverter can also include four sets of switches, and each set of switches can be connected across the positive, negative, and midpoint input terminals, each of the set of switches being connected to a respective one of the AC phases. The system can include logic operatively connected to the switches to condition DC power from the first and second 3-phase rectifiers into AC power output to the AC phases. Each set of switches can be connected to a respective one of the AC phases through a network of inductors and capacitors.

Another system includes a first 3-phase rectifier having a positive DC lead and a negative DC lead and a second 3-phase rectifier having a positive DC lead and a negative DC lead. The positive DC lead of the first 3-phase rectifier can be connected to a positive output terminal, the negative DC lead of the first 3-phase rectifier can be connected to a midpoint output terminal, and the positive DC lead of the second 3-phase rectifier can be connected to the midpoint output terminal. The negative DC lead of the second 3-phase rectifier can be connected to a negative output terminal.

A method comprises receiving variable frequency, 3-phase power from a first generator, receiving variable frequency, 3-phase power from a second generator, rectifying the variable frequency, 3-phase power from each of the first and second generators into DC power. And inverting the DC power into 4-phase, constant frequency power for powering a load.

Inverting DC power into 4-phase, constant frequency power can include receiving the DC power as three level DC power. Receiving power from each of the first and second generators can further include receiving the power from the generators operating at the same speed. Inverting the DC power into 4-phase, constant frequency power can further include outputting neutral phase in the 4-phase constant frequency power.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
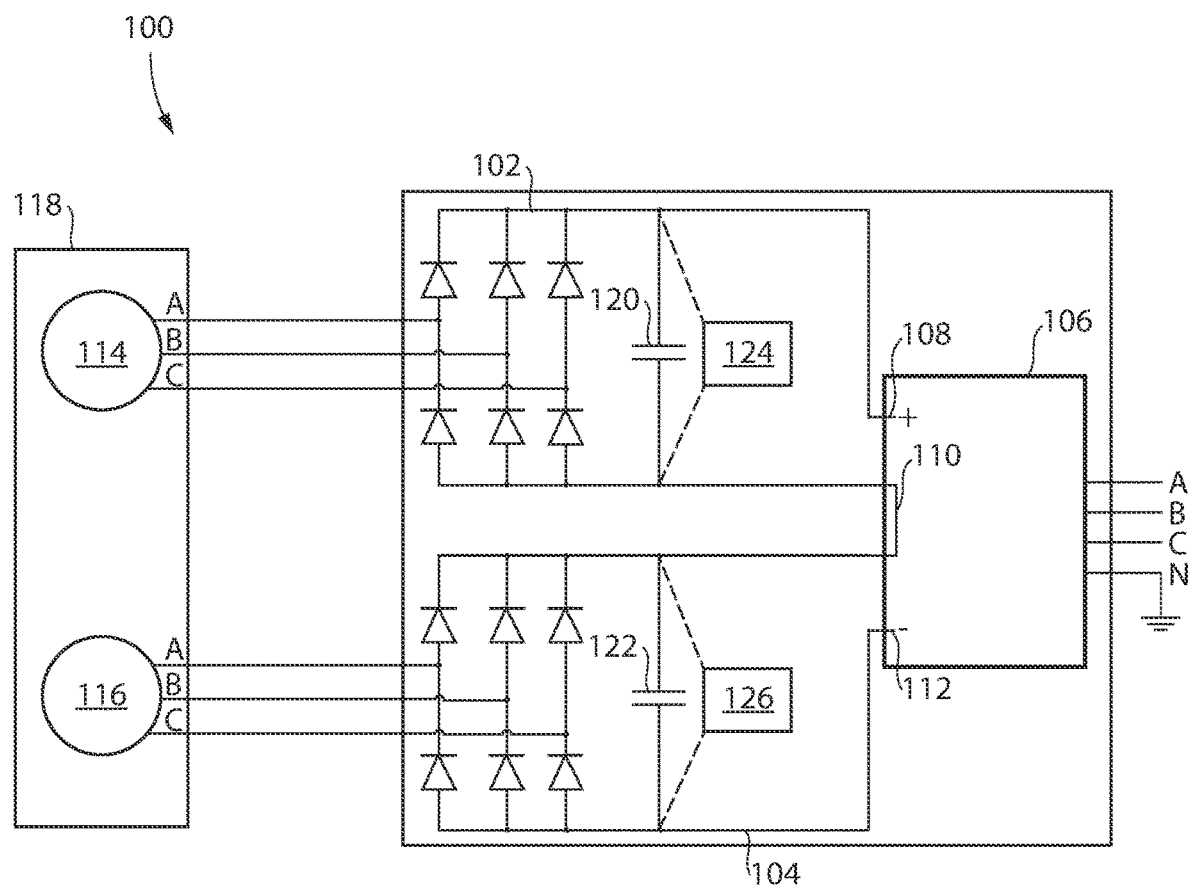
FIG. 1 is a schematic of an embodiment of a system constructed in accordance with the present disclosure, showing the connection between generators, rectifiers, and inverters.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used to provide sufficient voltage headroom for a 3-level inverter, without the need for step-up transformers.

A system 100 comprises a first 3-phase rectifier 102 (hereinafter referred to as "first rectifier 102") having a positive DC lead and a negative DC lead and a second 3-phase rectifier (hereinafter referred to as "second rectifier 104") 104 having a positive DC lead and a negative DC lead. A 4-phase, 3-level inverter 106 (hereinafter referred to as "inverter 106") can be connected to the first and second rectifiers 102,104 through respective leads.

Figure 2:
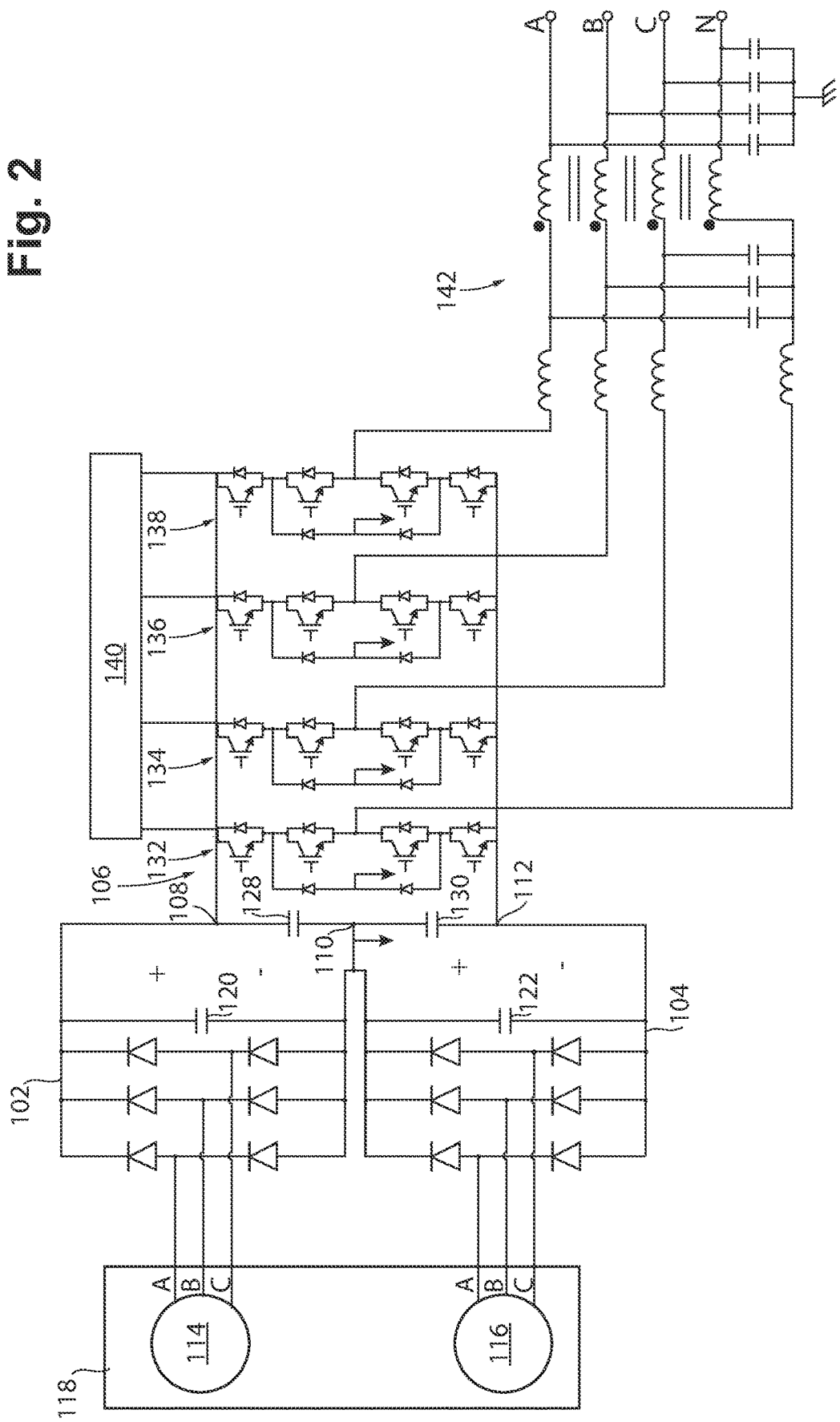
FIG. 2 is a detailed schematic circuit diagram of the system of FIG. 1 showing the switches in the 4-phase, 3-level inverter.

For example, as shown in FIGS. 1-2, the positive DC lead of the first rectifier 102 can be connected to a positive input terminal 108 of the inverter 106 and the negative DC lead can be connected to a midpoint input terminal 110 of the inverter 106. The positive DC lead of the second rectifier 104 can be connected to the midpoint input terminal 110 of the inverter 106 and the negative DC can be connected to a negative input terminal 112 of the inverter 106. The inverter 106 can include a respective output for each of three AC phases A,B,C, and a respective output for a neutral AC phase N.

The system 100 can also include a first generator 114 with three phases A,B,C connected to the first rectifier 102, and second generator 116 with three phases A,B,C connected to the second rectifier 104. In embodiments, the first and second generators 114,116 can be variable frequency generators, for example. Shown schematically in FIGS. 1-2, the first and second generators 114,116, can also be connected to a common output shaft 118 of a prime mover, or the generators 114,116 can be connected to separate prime movers (prime mover(s) not shown).

Each of the three input phases A,B,C of the first and second rectifiers 102,104 can be configured as a 115 V phase, and each of the first and second rectifiers 102,104 can be configured for 270 V output to the inverter 106. The inverter 106 can be configured to output 115 V, 400 Hz AC power from the four AC phases A,B,C,N. Each of the first and second rectifiers 102,104 can include a respective capacitor 120,122 connected across the respective positive and negative DC leads. The system 100 can also include at least one generator control unit 124,126 operatively connected to control the first and second generators 114,116 using feedback measured across the respective capacitors 120,122.

Referring now to FIG. 2, the inverter 106 can include a first input capacitor 128 connected in series with a second input capacitor 130. For example, the first input capacitor 128 can connect between the positive and midpoint input terminals 108,110 of the inverter 106, and the second capacitor 130 can connect between the midpoint and negative input terminals 110, 112. The inverter 106 can also include four sets of switches and diodes 132,134,136,138 where each of these sets can be configured in a 3-level inverter phase leg. Each set of switches and diodes 132,134, 136,138 can be connected across the positive, negative, and midpoint input terminals 108, 112, and 110 respectively, and each of the set of switches 132,134,136,138 can be connected to a respective one of the AC phases A,B,C,N. The system 100 can also include logic 140 operatively connected to the switches 132,134,136,138 to condition DC power from the first and second rectifiers 102,104 into AC power output to the AC phases A,B,C,N. Each set of switches 132,134,136,138 can also be connected to a respective one of the AC phases A,B,C,N through a network of inductors and capacitors 142.

Figure 3:
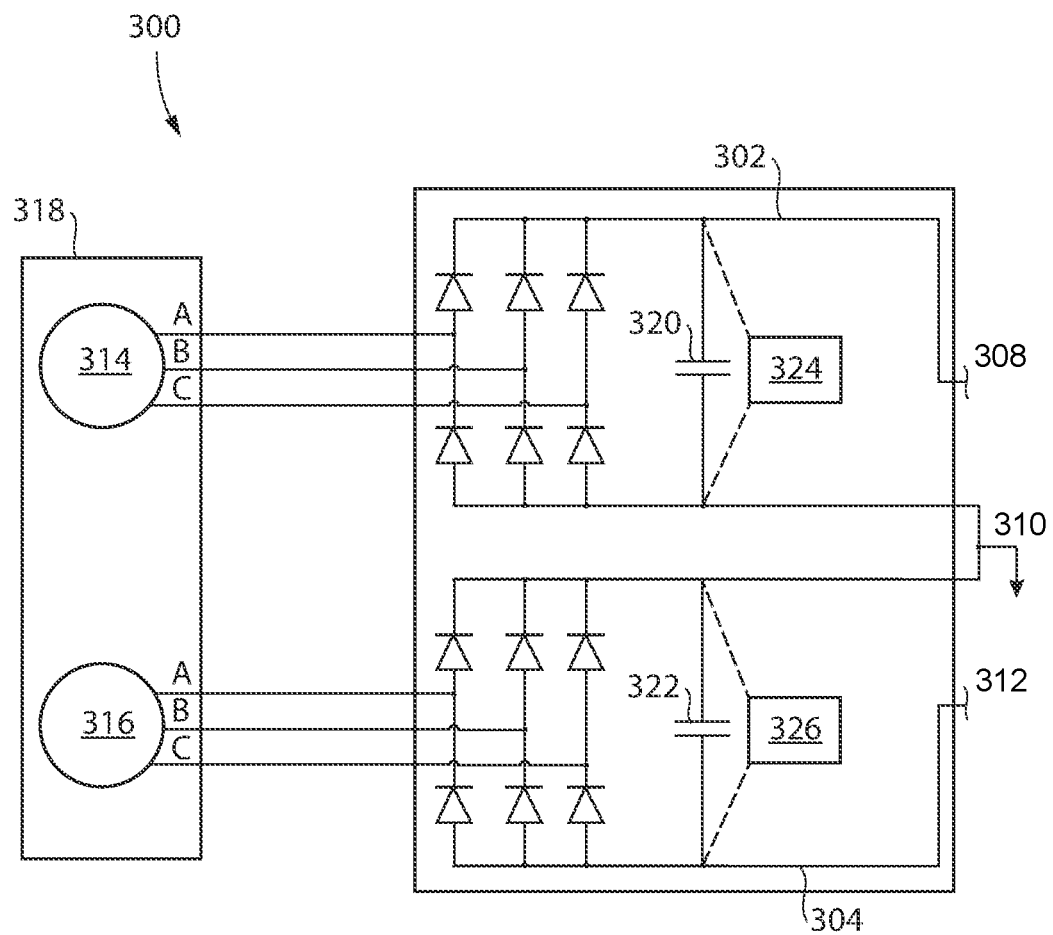
FIG. 3 is a schematic of an embodiment of a system constructed in accordance with the present disclosure, showing the connection between generators and rectifiers.

Referring now to FIG. 3, a system 300 can include a first rectifier 302 having a positive and a second rectifier 304. A positive DC lead of the first rectifier 302 can be connected to a positive output terminal 308 (e.g. for +270 V DC aircraft power) and a negative DC lead of the first rectifier 302 can be connected to a midpoint output terminal 310 (e.g. for ±270 V DC aircraft power). A positive DC lead of the second rectifier 304 can be connected to the midpoint output terminal 310 and a negative DC lead of the second rectifier 304 can be connected to a negative output terminal 312 (e.g. for −270 V DC aircraft power). As shown, a generator 314 may be connected to the first rectifier 302 and a second generator 316 may be connected to the second rectifier 304. The system 300 may be similar to that of system 100 described above, in that generators 314,316 may be variable frequency generators, may output the three AC phases A,B,C, and may be connected to a common shaft of a prime mover, or the generators 314,316 may be connected to separate prime movers. Additionally, the system 300 can also include at least one generator control unit 324,326 operatively connected to control the first and second generators 314,616 using feedback measured across the respective capacitors 320,322.

Figure 4:
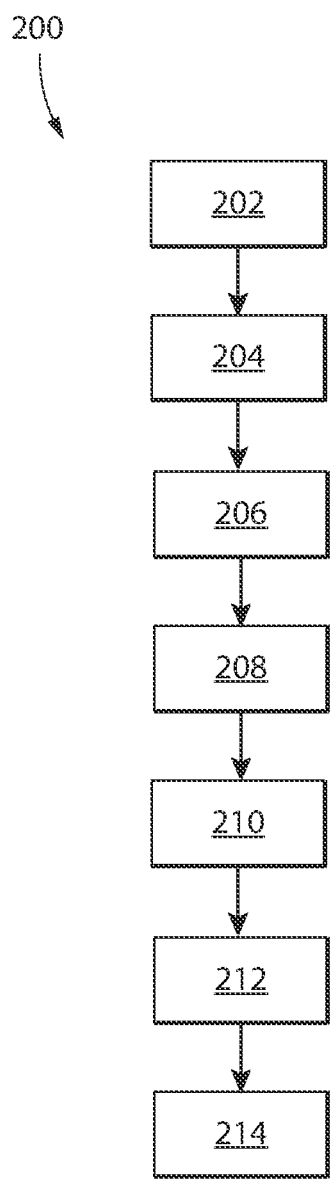
FIG. 4 is a schematic block diagram showing a method in accordance with at least one aspect of this disclosure.

Shown in FIG. 4, a method 200 can comprise, at boxes 202 and 204, receiving variable frequency, 3-phase power from a first generator 114 and receiving variable frequency, 3-phase power from a second generator 116. Shown at box 206, the method 200 can include rectifying the variable frequency, 3-phase power from each of the first and second generators 114,116 into DC power. At box 208, the method 200 can include inverting the DC power into 4-phase, constant frequency power for powering a load, for example using inverter 106 as described above.

Inverting DC power into 4-phase, constant frequency power can include, at box 210, receiving the DC power as three level switched DC power. Shown at box 212, receiving power from each of the first and second generators 114,116 can further include receiving the power from the generators 114,116 operating at the same speed, e.g. because generators 114,116 can be on the same shaft 118 of a prime mover or different prime movers. Further, at box 214, inverting the DC power into 4-phase, constant frequency power can further include outputting neutral phase N in the 4-phase constant frequency power.

The methods and systems of the present disclosure, as described above and shown in the drawings, provide for high efficiency, lightweight VSCF generation. For example, a total DC link of 540 Vdc provides sufficient voltage headroom for the inverter to adequately produce a high quality 115 Vac VSCF output across all operating loads and/or conditions, such as linear, non-linear, and motor-driven aircraft accessories (e.g. pumps, compressors, fans), without the need for step-up transformer. While the apparatus and methods of the subject disclosure have been shown and described, those skilled in the art will readily appreciate that changes and/or modifications may be made thereto without departing from the scope of the subject disclosure.

What is claimed is:

1. A system comprising:
    a first 3-phase rectifier having a positive DC lead and a negative DC lead;
    a second 3-phase rectifier having a positive DC lead and a negative DC lead; and
    a 4-phase, 3-level inverter connected to the first and second 3-phase rectifiers, wherein the positive DC lead of the first 3-phase rectifier is connected to a positive input terminal of the 4-phase, 3-level inverter, wherein the negative DC lead of the first 3-phase rectifier is connected to a midpoint input terminal of the 4-phase, 3-level inverter, wherein the positive DC lead of the second 3-phase rectifier is connected to the midpoint input terminal of the 4-phase, 3-level inverter, wherein the negative DC lead of the second 3-phase rectifier is connected to a negative input terminal of the 4-phase, 3-level inverter, and wherein the 4-phase, 3-level inverter includes a respective output for each of four AC phases including a neutral AC phase.

2. The system as recited in claim 1, further comprising a first generator with three phases connected to the first 3-phase rectifier, and second generator with three phases connected to the second 3-phase rectifier.

3. The system as recited in claim 2, wherein the first and second generators are variable frequency generators.

4. The system as recited in claim 2, wherein the first and second generators are connected to a common output shaft of a prime mover.

5. The system as recited in claim 2, wherein the first and second generators are connected to a respective output shaft of a respective prime mover.

6. The system as recited in claim 1, wherein each of the three phases of the first and second rectifiers is configured as a 115 V input phase, wherein each of the first and second 3-phase rectifiers is configured for 270 V output to the 4-phase, 3-level inverter, and wherein the 4-phase, 3-level inverter is configured to output 115 V, 400 Hz AC power from the four AC phases.

7. The system as recited in claim 1, wherein each of the first and second 3-phase rectifiers includes a respective capacitor connected across the respective positive and negative DC leads.

8. The system as recited in claim 6, further comprising at least one GCU (generator control unit) operatively connected to control the first and second generators using feedback measured across the respective capacitors.

9. The system as recited in claim 1, wherein the 4-phase, 3-level inverter includes a first input capacitor connected in series with a second input capacitor, wherein the first input capacitor connects between the positive and midpoint input terminals of the 4-phase, 3-level inverter, and wherein the second capacitor connects between the midpoint and negative input terminals of the 4-phase, 3-level inverter.

10. The system as recited in claim 9, wherein the 4-phase, 3-level inverter includes four sets of switches, each set of switches connected across the positive, negative, and midpoint input terminals, and each of the set of switches being connected to a respective one of the AC phases.

11. The system as recited in claim 10, further comprising logic operatively connected to the switches to condition DC power from the first and second 3-phase rectifiers into AC power output to the AC phases.

12. The system as recited in claim 10, wherein each set of switches is connected to a respective one of the AC phases through a network of inductors and capacitors.

13. A method comprising:
    receiving variable frequency, 3-phase power from a first generator;
    receiving variable frequency, 3-phase power from a second generator;
    rectifying the variable frequency, 3-phase power from each of the first and second generators into DC power;
    inverting the DC power into 4-phase, constant frequency power for powering a load.

14. The method as recited in claim 13, wherein inverting DC power into 4-phase, constant frequency power includes receiving the DC power as three level DC power.

15. The method as recited in claim 14, wherein receiving power from each of the first and second generators includes receiving the power from the generators operating at the same speed.

16. The method as recited in claim 13, wherein inverting the DC power into 4-phase, constant frequency power includes outputting neutral phase in the 4-phase constant frequency power.

17. A system comprising:
    a first 3-phase rectifier having a positive DC lead and a negative DC lead;
    a second 3-phase rectifier having a positive DC lead and a negative DC lead;
    wherein the positive DC lead of the first 3-phase rectifier is connected to a positive output terminal, wherein the negative DC lead of the first 3-phase rectifier is connected to a midpoint output terminal, wherein the positive DC lead of the second 3-phase rectifier is connected to the midpoint output terminal, and wherein the negative DC lead of the second 3-phase rectifier is connected to a negative output terminal.

* * * * *